(12) United States Patent
Savic et al.

(10) Patent No.: US 9,575,689 B2
(45) Date of Patent: Feb. 21, 2017

(54) DATA STORAGE SYSTEM HAVING SEGREGATED CONTROL PLANE AND/OR SEGREGATED DATA PLANE ARCHITECTURE

(71) Applicant: EMC Corporation, Hopkinton, MA (US)

(72) Inventors: Dragan Savic, Brookline, MA (US); Michael Robillard, Shrewsbury, MA (US); James Espy, Andover, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 14/751,980

(22) Filed: Jun. 26, 2015

(65) Prior Publication Data

US 2016/0378401 A1 Dec. 29, 2016

(51) Int. Cl.
*G06F 13/12* (2006.01)
*G06F 13/38* (2006.01)
*G06F 3/06* (2006.01)

(52) U.S. Cl.
CPC ............. *G06F 3/0659* (2013.01); *G06F 3/067* (2013.01); *G06F 3/0608* (2013.01)

(58) Field of Classification Search
None
See application file for complete search history.

(56) References Cited

U.S. PATENT DOCUMENTS

| 8,804,571 B1* | 8/2014 | Tiwari | H04L 45/025 370/254 |
|---|---|---|---|
| 9,021,098 B1* | 4/2015 | Nagle | H04L 61/20 709/226 |
| 9,049,148 B1* | 6/2015 | Singh | H04L 45/54 |
| 2005/0281280 A1 | 12/2005 | Zur et al. | |
| 2009/0257434 A1* | 10/2009 | Song | H04L 47/10 370/392 |
| 2013/0089089 A1 | 4/2013 | Kamath et al. | |
| 2013/0108263 A1 | 5/2013 | Srinivas et al. | |
| 2013/0163607 A1 | 6/2013 | Shukla et al. | |
| 2013/0329743 A1 | 12/2013 | Gai et al. | |
| 2014/0059295 A1 | 2/2014 | Northcutt et al. | |
| 2014/0115137 A1 | 4/2014 | Keisam | |
| 2014/0115372 A1* | 4/2014 | Myrberg | G06F 1/3287 713/340 |
| 2014/0136779 A1* | 5/2014 | Guha | G06F 9/5066 711/114 |
| 2014/0198686 A1 | 7/2014 | Kamble et al. | |

(Continued)

*Primary Examiner* — Elias Mamo
(74) *Attorney, Agent, or Firm* — Ryan, Mason & Lewis, LLP

(57) ABSTRACT

Data storage systems are provided having a segregated control plane architecture, a segregated data plane architecture, or a segregated control plane and segregated data plane architecture. For example, a data storage system includes a plurality of media nodes and a plurality of data nodes coupled to the media nodes. The media nodes control and manage persistent storage elements. Each data node includes at least one hardware processor configured to execute data plane functions and control plane functions, wherein at least one of (i) the data plane functions of a given one of the data nodes are segregated and executed by different hardware processors and (ii) the control plane functions of a given one of the data nodes are segregated and executed by different hardware processors.

20 Claims, 10 Drawing Sheets

(56) References Cited

U.S. PATENT DOCUMENTS

| | | |
|---|---|---|
| 2014/0254607 A1 | 9/2014 | Anantharam et al. |
| 2014/0280827 A1 | 9/2014 | Kamble et al. |
| 2014/0280841 A1 | 9/2014 | Kamble et al. |
| 2014/0307556 A1 | 10/2014 | Zhang |
| 2014/0337391 A1 | 11/2014 | Starovoitov et al. |
| 2014/0365622 A1 | 12/2014 | Iyengar et al. |
| 2014/0379928 A1 | 12/2014 | Song et al. |
| 2015/0067212 A1 | 3/2015 | Talla |
| 2015/0071053 A1 | 3/2015 | Kempf et al. |
| 2015/0092593 A1 | 4/2015 | Kompella |
| 2015/0113038 A1 | 4/2015 | Fedders et al. |

* cited by examiner

300

400

500

600

DATA STORAGE SYSTEM HAVING SEGREGATED CONTROL PLANE AND/OR SEGREGATED DATA PLANE ARCHITECTURE

FIELD

The field relates generally to computing networks, and in particular, to data storage systems and methods employed in computing networks.

BACKGROUND

Conventional data storage architectures have leveraged technological advances in general purpose microprocessors to run integrated storage control plane and data plane architectures, wherein the storage processing control and data plane functions have been converged onto a general purpose microprocessor. Such conventional architectures are problematic for various reasons. For example, general purpose microprocessor solutions may provide sub-optimal performance in executing certain data plane functions. Moreover, integrated control and data plane architectures require tight coupling between media (e.g., disk and FLASH) and compute elements. This tight coupling fixes compute-to-media ratios, and makes scaling difficult. This limitation manifests itself as reduced system efficiency across widely varying workloads. Furthermore, current storage architectures are difficult to scale out. Indeed, system scale out requires sharing of system information amongst system elements. As the amount of shared information can increase exponentially, the amount of available system resources (memory bandwidth, CPU cycles, I/O bandwidth, etc.) can be readily exceeded. Moreover, future workloads are difficult to predict, especially in hyper scale computing in distributed computing environment in which the demand for certain types of workloads (as well as volume of data) can increase exponentially.

SUMMARY

Illustrative embodiments include data storage systems having a segregated control plane architecture, or a segregated data plane architecture, or a segregated control plane and segregated data plane architecture.

One embodiment of the invention includes a data storage system. The data storage system includes a plurality of media nodes, a plurality of data nodes coupled to the media nodes, and a switch fabric configured to enable communication between the data nodes. The media nodes are configured to control data access operations for storing or accessing data to and from one or more persistent storage elements associated with the media nodes. Each data node includes at least one hardware processor configured to execute data plane functions and control plane functions on data that is to be stored in one or more of the persistent storage elements of the media nodes, wherein at least one of (i) the data plane functions of at least a given one of the data nodes are segregated and executed by different hardware processors and (ii) the control plane functions of at least a given one of the data nodes are segregated and executed by different hardware processors.

Other embodiments of the invention include, without limitation, methods, computer networks, systems and articles of manufacture comprising processor-readable storage media.

DETAILED DESCRIPTION

Figure 1:
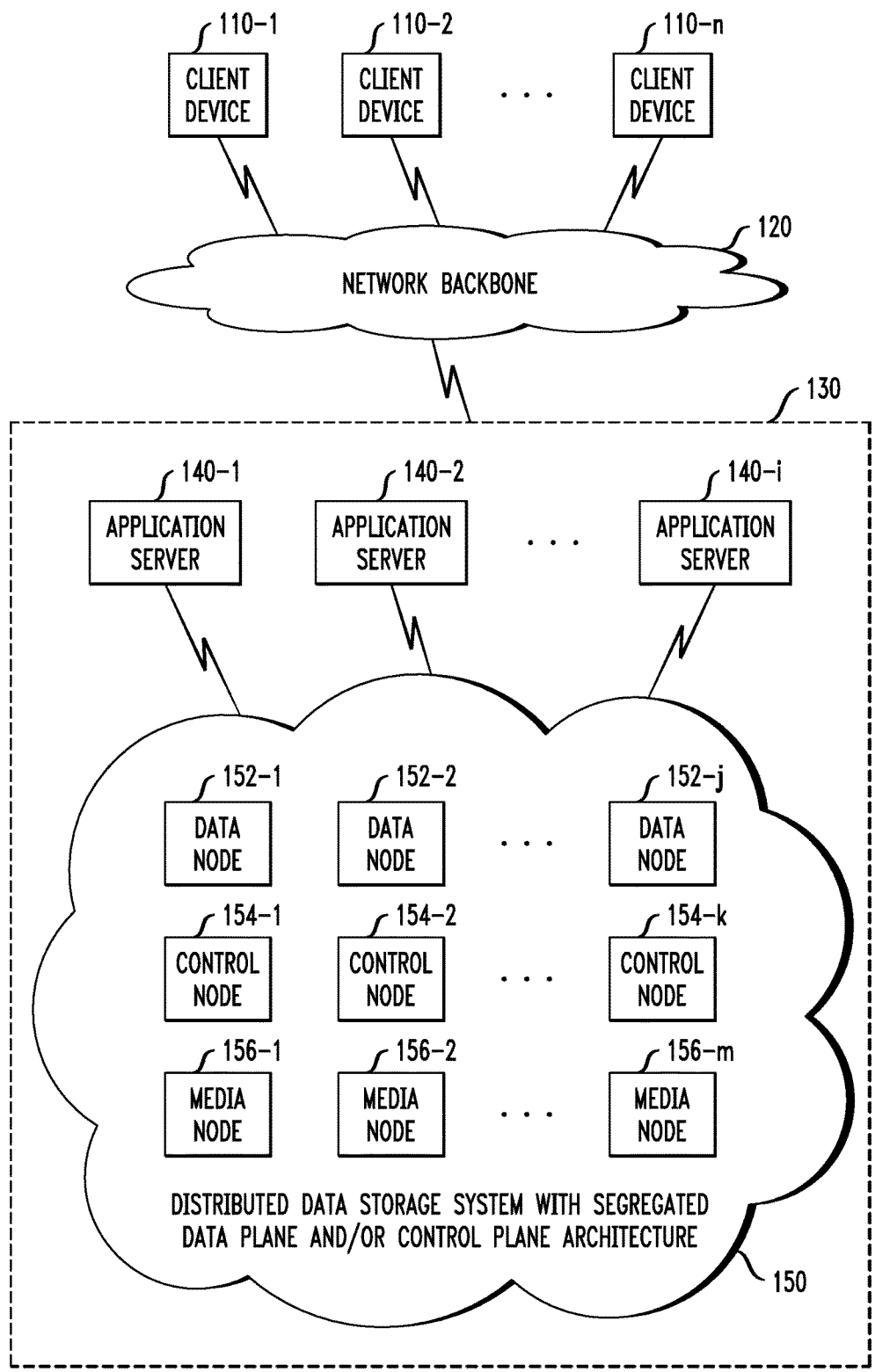
FIG. 1 schematically illustrates a computing system which implements a data storage system having a segregated control plane and data plane architecture, according to an embodiment of the invention.

Illustrative embodiments will now be described in further detail with regard to computing systems and, in particular, computing systems which comprise data storage systems having segregated control plane and/or segregated data plane architectures. Embodiments described herein provide extensible data storage architectures in which control plane functions and/or data plane functions for data storage systems are segregated and executed on different hardware processors to provide efficient, high performance, scalable storage or converged infrastructure solutions which leverage optimized processors, coprocessor based (fixed function) acceleration, distributed processing, and distributed fabric technology, for example.

It is to be understood that the term "computing system" as used herein is intended to be broadly construed, so as to encompass, for example, any system comprising multiple networked processing devices such as a data center or any private or public cloud computing system or enterprise network. Moreover, the term "data storage system" as used herein is intended to be broadly construed, so as to encompass, for example, any type of data storage system, or combination of data storage systems, including, but not limited to storage area network (SAN) systems, network attached storage (NAS) systems, Hadoop Distributed File System (HDFS), as well as other types of data storage systems comprising clustered or distributed virtual and/or physical infrastructure.

The term "hardware processor" as used herein is intended to be broadly construed, so as to encompass all types of processors including, for example, (i) general purpose processors which comprise "performance cores" (e.g., low latency cores), and (ii) optimized processors, which comprise any possible combination of multiple "throughput cores" and/or multiple hardware-based accelerators (e.g., protocol termination, cryptographic, compression, de-duplication, RAID, etc.). Examples of optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

Furthermore, the term "control plane" as used herein refers to a set of control functions that are executed to control the flow of data through a data storage system, for example, the "signaling" of the system. Moreover, the term "data plane" as used herein (also referred to as the "forwarding plane") refers to a processing path that data takes as the data flows through the data storage system (e.g., a sequence of data processing functions performed on data that is received from a network entity and stored in a data storage system, or a sequence of data processing functions performed on data that is accessed from the data storage system and transmitted to some network entity requesting the data).

In addition, the term "segregation" as used herein with regard to control plane functionality refers to the concept of segregating (e.g., splitting) a control plane into two or more different sets of control plane functions (each set comprising one or more control plane functions), wherein each set of control plane functions is implemented on a different hardware processor. Similarly, the term "segregation" as used herein with regard to data plane functionality refers to the concept of segregating (e.g., splitting) a data plane into two or more different sets of data plane functions (each set comprising one or more data plane functions), wherein each set of data plane functions is implemented on a different hardware processor. In accordance with embodiments of the invention as discussed herein, segregation of control plane functions and/or data plane function into different sets of functions is based on one or more discrimination criteria such as, e.g., efficiency of execution of a given function on a given hardware processor.

FIG. 1 schematically illustrates a computing system which implements a data storage system having a segregated control plane and data plane architecture, according to an embodiment of the invention. In particular, FIG. 1 schematically illustrates a computer network 100 comprising a plurality of client devices 110-1, 110-2, . . . , 110-n (collectively referred to as client devices 110), a network 120, and a computing system 130. The computing system 130 comprises a plurality of application servers 140-1, 140-2, . . . , 140-i (collectively referred to as application servers 140), and a data storage system 150. The data storage system 150 comprises a distributed system having a plurality of data nodes 152-1, 152-2, . . . , 152-j (collectively referred to as data nodes 152), a plurality of control nodes 154-1, 154-2, . . . , 154-j (collectively referred to as control nodes 154), and a plurality of media nodes 156-1, 156-2, . . . , 156-m (collective referred to as media nodes 156).

In one embodiment of the invention, the media nodes 156 comprises data storage units that are configured to control data access operations for storing or accessing data to and from one or more persistent storage elements that are associated with the media nodes 156. The persistent storage elements can be implemented using one or more different types of persistent storage devices such as HDDs (hard disk drives), flash storage devices, disk storage devices, SSD (solid state drive) devices, or other types and combinations of non-volatile memory.

The data nodes 152 comprise compute nodes (e.g., server nodes) that are configured to execute data plane functions using one or more hardware processors. In accordance with embodiments of the invention, one or more of the data nodes 152 in the data storage system 150 implement one or more optimized hardware processors (e.g., hardware accelerator) to efficiently execute one or more data plane functions of the data plane. The control nodes 154 comprise compute nodes (e.g., server nodes) that are configured to execute control plane functions using one or more hardware processors. In accordance with embodiments of the invention, the control nodes 154 are utilized to execute one or more control plane functions (e.g., global control plane functions), which are segregated from other control plane functions executed on the data nodes 152, and thereby increase system performance and efficiency by executing such control plane functions (e.g., global control functions) on the control nodes 154.

In one embodiment, the computing system 130 may comprise one or more data centers that perform data computing and data storage functions to support one or more network applications and/or on-line services which are associated with private or public entities. In another embodiment, the computing system 130 may comprise a private or public business enterprise network that hosts and manages consumer or business applications, which are used by multiple, simultaneously connected local or remote users. Depending on the implementation of the computing system 130, the application servers 140 are configured to, e.g., execute business logic, execute scripts and services to query databases, and perform other computing functions that are needed to host and deliver consumer or business applications and services to multiple end users, service providers, and/or organizations.

In another embodiment, the computing system 130 may be comprised of a plurality of virtual machines (VMs) that are implemented using a hypervisor, and which execute on one or more of the data nodes 152, the control nodes 154 and/or the media nodes 156. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 130 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

The client devices 110 may comprise, for example, desktop computers, laptop computers, PDAs (personal digital assistants), smart phones, electronic tablets, or other types of computing devices that enable users and other entities to access the computing system 130 via the network 120. The network 120 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed to encompass a wide variety of different network arrangements, including combinations of multiple networks possibly of different types. In this regard, the network 120 in some embodiments therefore comprises combinations of multiple different types of communications networks each comprising network devices configured to communicate using Internet Protocol (IP) or other related communication protocols. The network 120 comprises intermediate points (such as routers, switches, etc.) and other elements that form a network backbone to establish communication paths and enable communication between network endpoints.

In one embodiment of the invention, the data storage system 150 is configured as a storage network to provide a centralized repository for data that can be stored and accessed by the application servers 140. More specifically, in one embodiment of the invention, the data nodes 152, the control nodes 154, and the media nodes 156 comprise a plurality of network connected nodes that collectively provide a pool of storage resources which can be utilized by the application servers 140. The data storage system 150 comprises a distributed data storage system in which the data nodes 152 are coupled to, and communicate with, the control nodes 154 and the media nodes 156, using various types of communication and storage protocols, as discussed in further detail below.

The data nodes 152 comprise one or more hardware processors that are configured to execute data plane functions and control plane functions on data that is to be stored in one or more of the persistent storage elements, and on data that is accessed from one or more of the persistent storage elements. In accordance with embodiments of the invention, the data plane functions of one or more of the data nodes 152 are segregated and executed on different hardware processors on the one or more data nodes 152 and/or one or more of the media nodes 156. In other embodiments of the invention, the control plane functions are segregated and executed on different hardware processors that reside on one or more of the of the data nodes 152, the control nodes 154 and/or the media nodes 156. By segregating the data plane and/or control plane functions, and distributing the segregated data plane and/or control plane functions over the data nodes 152, the control nodes 154, and/or the media nodes 156, extensible data storage systems can be realized in which execution of the data plane and or control plane functions are independently optimized and distributed in a manner that enables efficient scale out of a data storage system.

Figure 2:
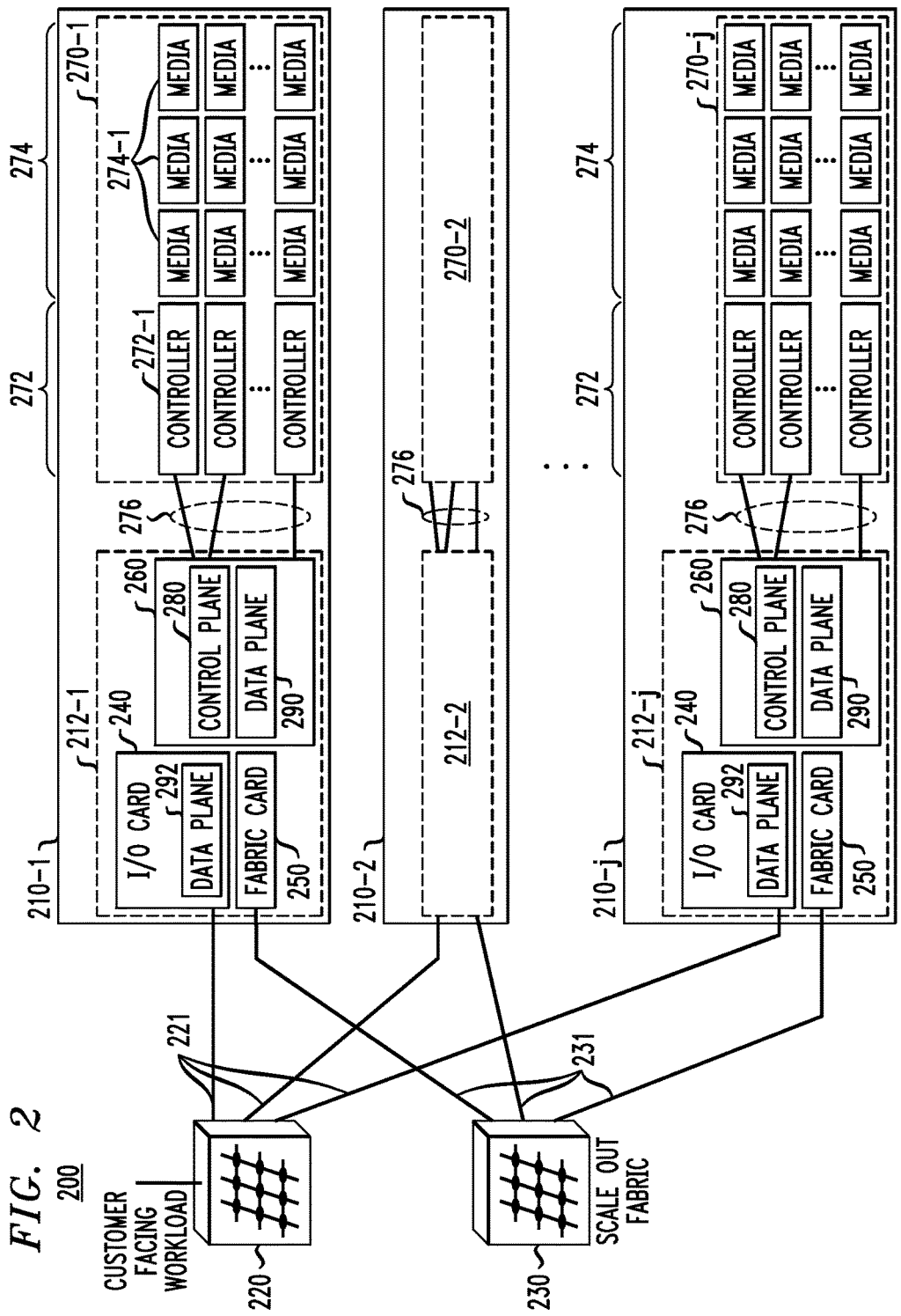
FIG. 2 schematically illustrates a data storage system having a segregated data plane architecture, according to an embodiment of the invention.
Figure 3:
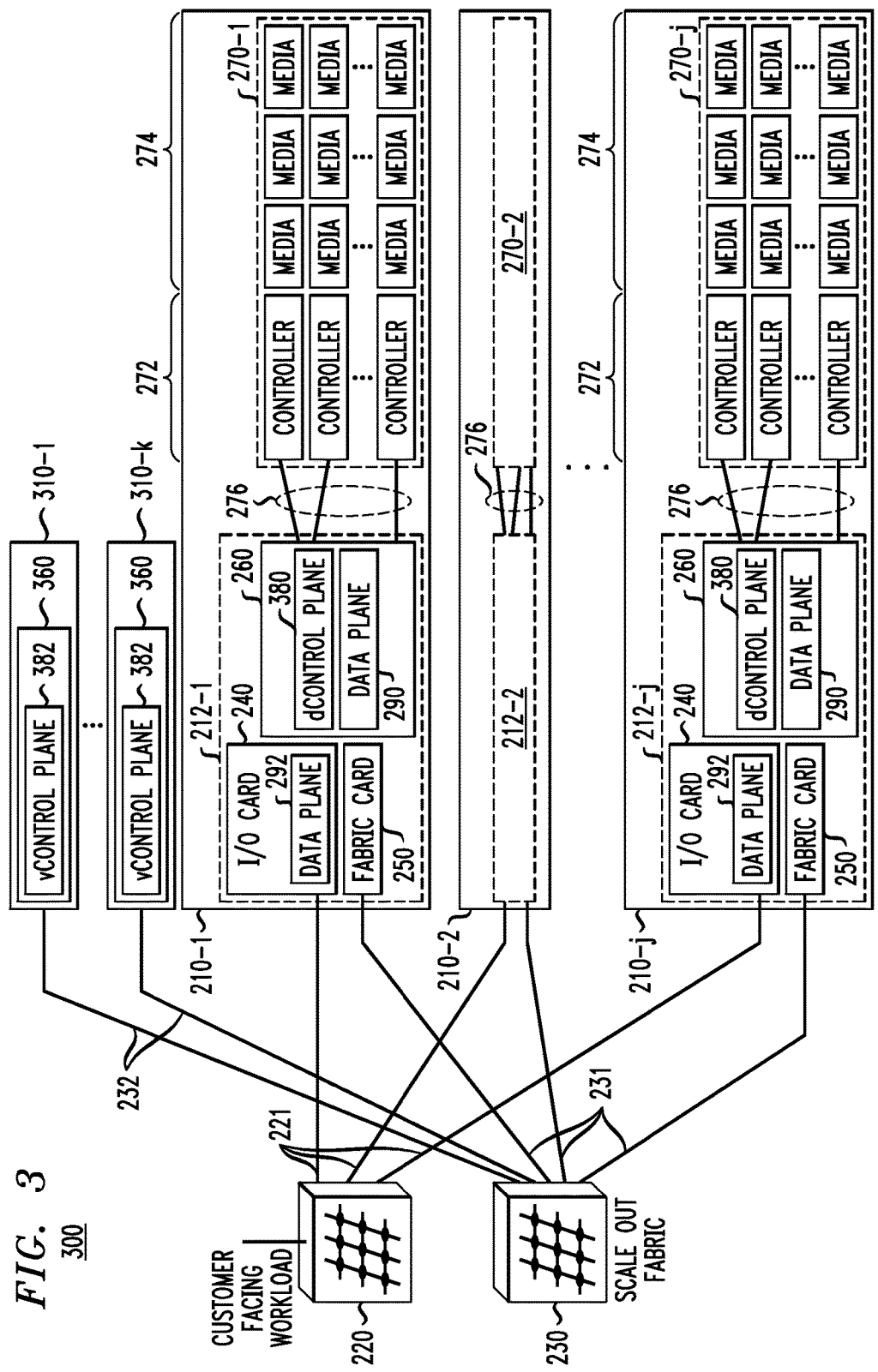
FIG. 3 schematically illustrates a data storage system having a segregated data plane and a segregated control plane architecture, according to an embodiment of the invention.
Figure 4:
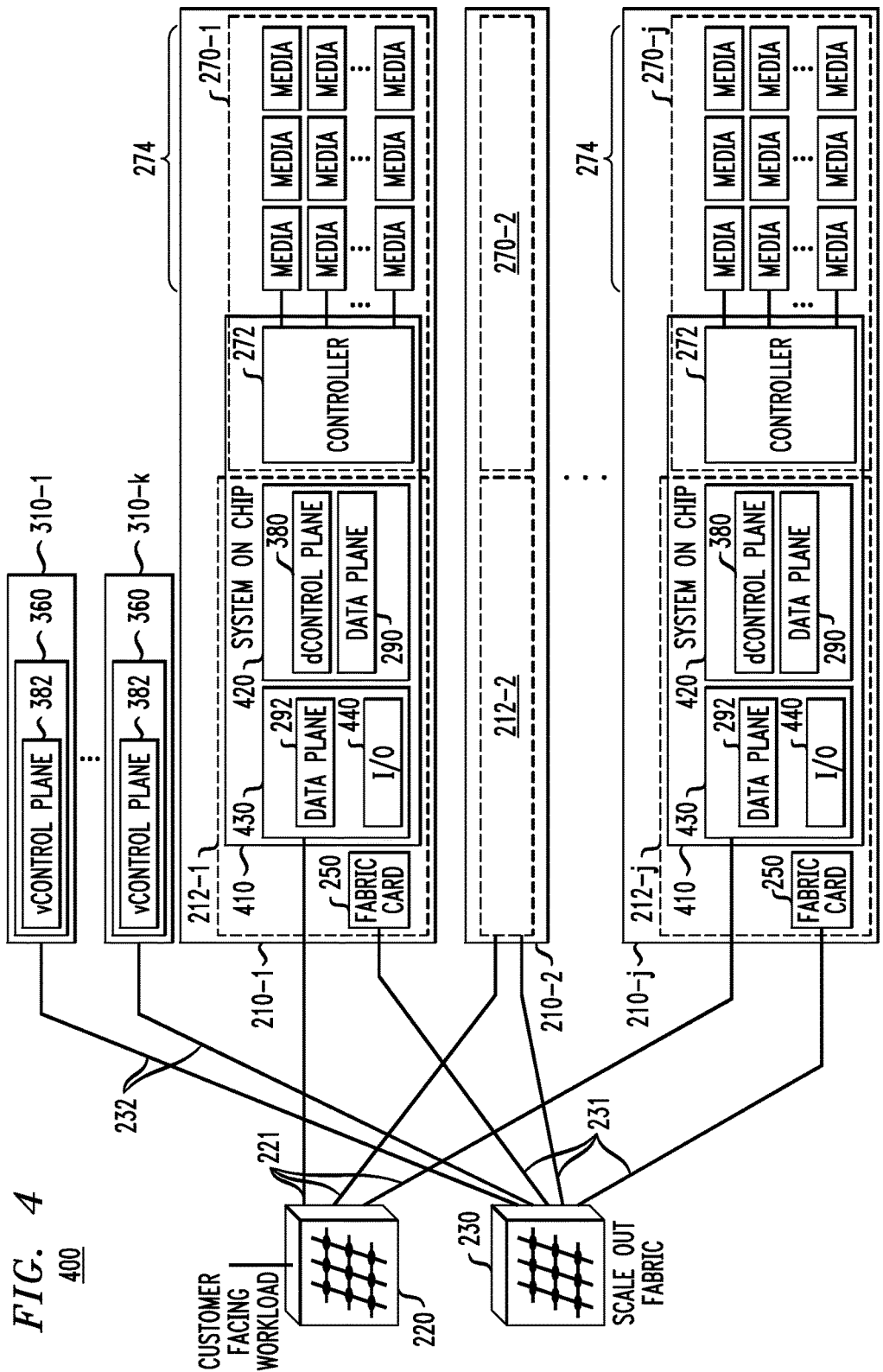
FIG. 4 schematically illustrates a data storage system having a segregated data plane and a segregated control plane architecture, according to another embodiment of the invention.
Figure 5:
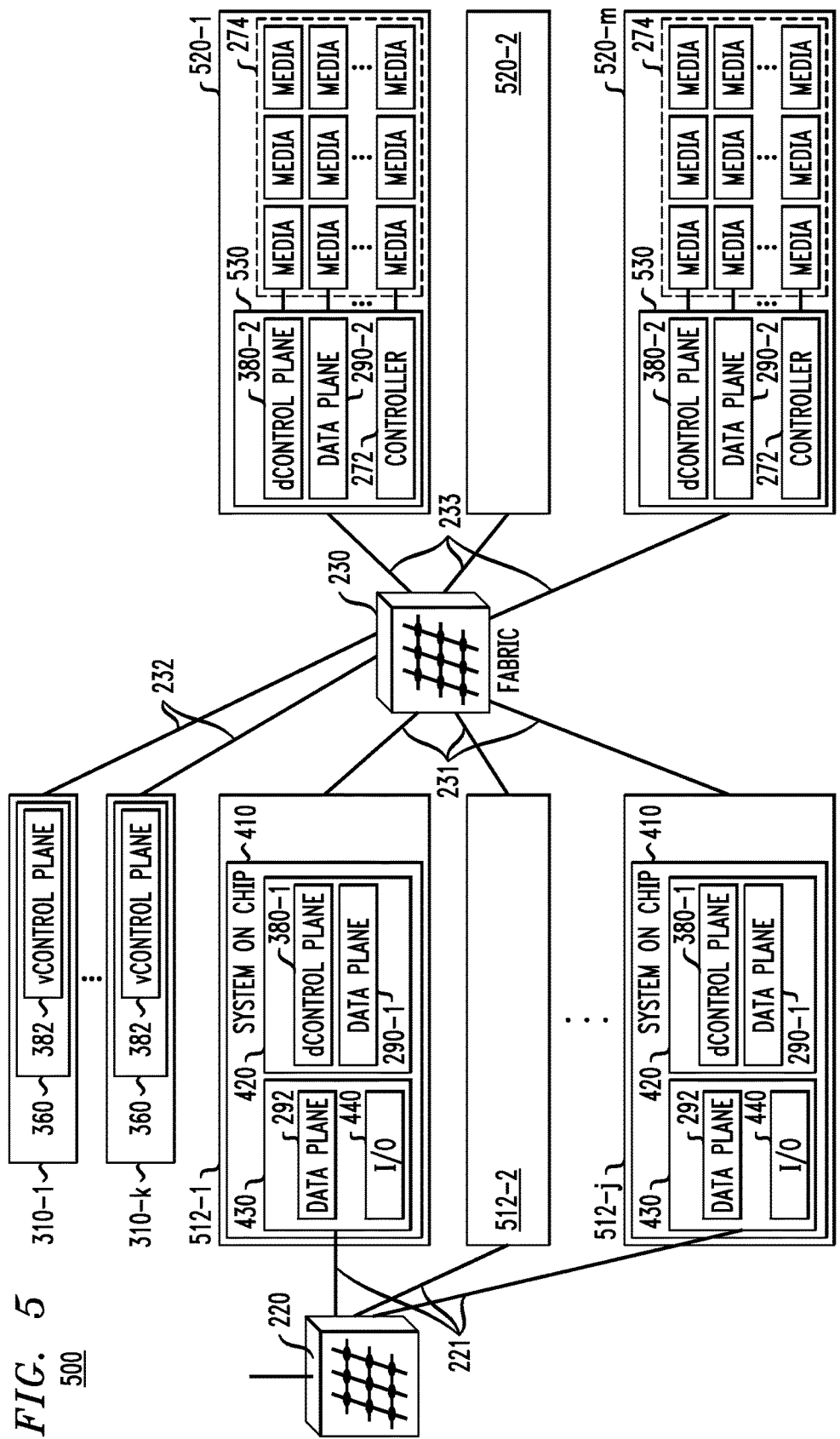
FIG. 5 schematically illustrates a data storage system having a segregated data plane and a segregated control plane architecture, according to yet another embodiment of the invention.
Figure 6:
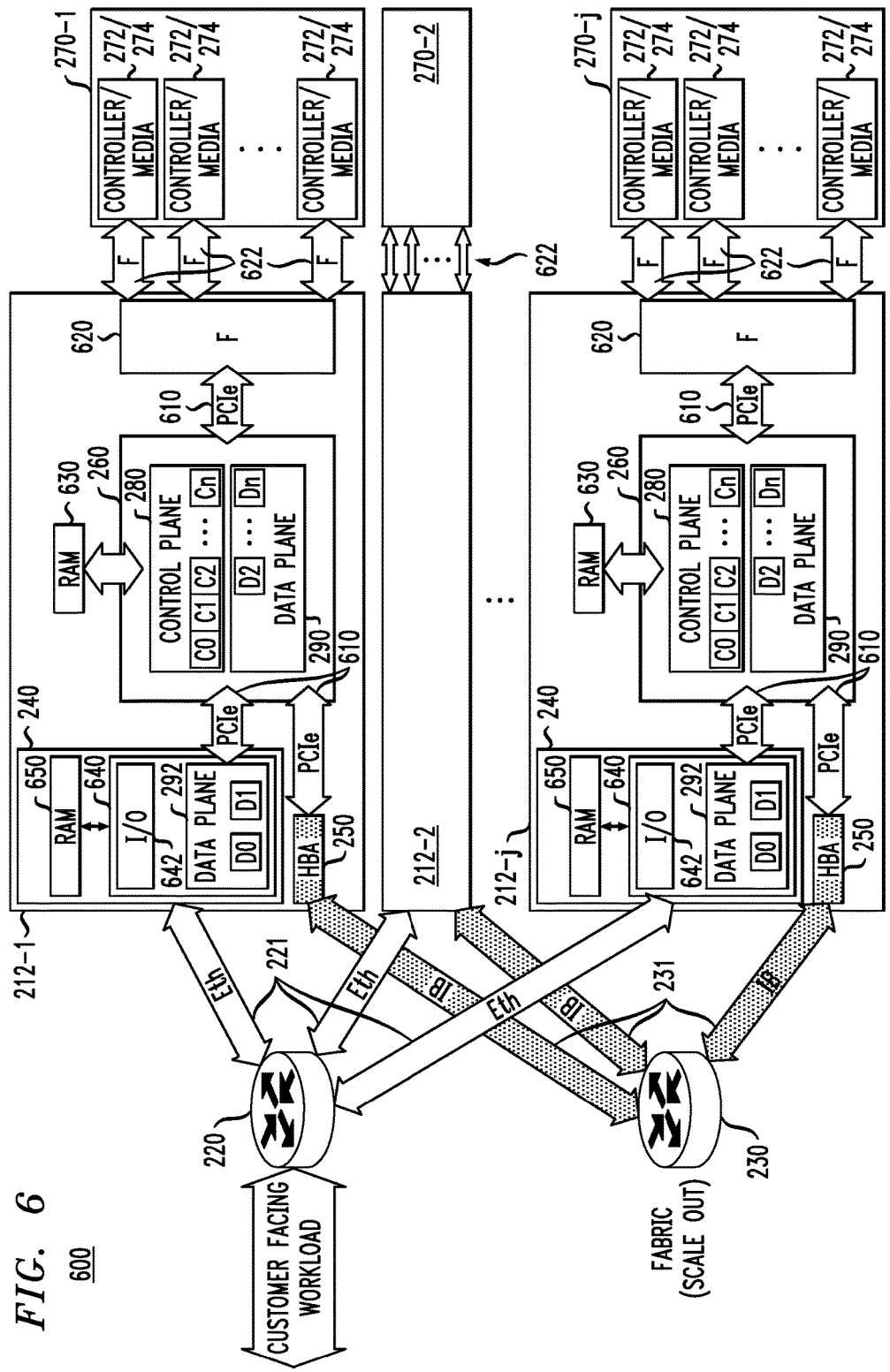
FIG. 6 schematically illustrates a specific implementation of a data storage system that is based on the architecture of FIG. 2, according to an embodiment of the invention.

Various alternative embodiments of the data storage system 150 of FIG. 1 will be discussed in further detail below with reference to FIGS. 2-11. For example, FIGS. 2 and 6 illustrate embodiments of the distributed data storage system 150 of FIG. 1, wherein data plane functions are segregated and executed by different hardware processors on the data nodes 152. FIGS. 3, 4, and 8 illustrate embodiments of the distributed data storage system 150 of FIG. 1, wherein data plane functions are segregated and executed by different hardware processors on the data nodes 152, and wherein control plane functions are segregated and executed by different hardware processors on the data nodes 152 and the control nodes 154. FIGS. 5 and 11 illustrate embodiments of the distributed data storage system 150 of FIG. 1, wherein data plane functions are segregated and executed by different hardware processors on the data nodes 152 and the media nodes 156, and wherein control plane functions are segregated and executed by different hardware processors on the data nodes 152, the control nodes 154, and the media nodes 156. It is to be noted that in the accompanying drawings, the same or similar reference numbers are used to denote the same or similar features, elements, or structures, and thus, a detailed explanation of the same or similar features, elements, or structures will not be repeated for each of the drawings.

FIG. 2 schematically illustrates a data storage system 200 having a segregated data plane architecture, according to an embodiment of the invention. The data storage system 200 of FIG. 2 comprises a plurality of server computers 210-1, 210-2, . . . , 210-j (collectively referred to as storage servers 210) which are connected in a switched fabric network topology comprising a first switch 220 and a second switch 230. The first switch 220 is configured to switchably connect customer facing workload servers (e.g., application servers 140, FIG. 1) to each of the storage servers 210-1, 210-2, . . . , 210-j via corresponding network links 221. The second switch 230 (e.g., scale out switch fabric) is configured to switchably connect the storage servers 210-1, 210-2, . . . , 210-j together via network links 231. In this regard, the first switch 220 comprises switching fabric to enable communication between the customer facing workload servers and the storage servers 210-1, 210-2, . . . , 210-j, while the second switch 230 comprises switching fabric to enable peer-to-peer communication between the storage servers 210-1, 210-2, . . . , 210-j. It is to be understood that the embodiment of FIG. 2 comprises an illustrative embodiment of FIG. 1 in which a given one of the data nodes 152 and a given one of the media nodes 156 are housed together in, or otherwise constitute, a separate storage server machine.

In the example embodiment shown in FIG. 2, each storage server 210-1, 210-2, . . . , 210-j comprises a respective data node 212-1, 212-2, . . . , 212-j, and a respective media node 270-1, 270-2, . . . , 270-j (collectively referred to as data nodes 212 and media nodes 270). Each data node 212 comprises a network interface card 240, a fabric card 250, and a hardware processor 260. Each media node 270 comprises memory controllers 272 and corresponding media devices 274. The memory controllers 272 are connected to corresponding hardware processors 260 through associated communication interfaces/links 276 (e.g., Serial Attached SCSI (SAS), Serial Advanced Technology Attachment (SATA), etc.). Each memory controller 272 is connected to an array of media devices 274. For example, as shown in FIG. 2, the memory controller 272-1 is connected to an array of media devices 274-1 (e.g., disk drives, flash devices, etc.). The memory controllers 272 are implemented using a combination of hardware and firmware, and are configured to control and manage the flow of data that is stored to and accessed from the associated media devices 274.

The network interface cards 240 are implemented using a combination of hardware and firmware, and are configured to control data input/output functions for respective storage servers 210. The network interface cards 240 enable communication with application servers and other network entities using a standard physical layer and data link layer protocol such as Ethernet, Fibre Channel, Wi-Fi, etc. The network interface cards 240 enable communication between the servers on the same LAN, or communication through other protocols such as the Internet Protocol.

The switch fabric cards 250 are implemented using a combination of hardware and firmware, and are configured to control and manage communication links between the storage servers 210 and the second switch 230 to thereby enable peer-to-peer communication between the storage servers 210. The fabric cards 250 may comprise a host bus adapter (i.e., plug in card) to connect a corresponding one of the storage servers 210 to other network devices using one or more of known networking protocols. In one embodiment, the fabric cards 250 may be implemented using a PCI Express expansion card that plugs into a bus of the host servers 210 to transmit InfiniBand, or Ethernet protocols, for example.

In one embodiment of the invention, each hardware processor 260 comprises a general purpose processor having one or more processing cores and other processing circuitry that is commonly implemented for general purpose processors. Each data node 212 of the storage servers 210 executes control plane functions 280 and data plane functions 290/292 for data that is to be stored in, or accessed from, one or more media devices 274 of associated media nodes 270. In the example embodiment of FIG. 2, for each data node 212, the control plane functions 280 are executed on the hardware processor 260, while the data plane functions 290/292 are segregated and executed by different hardware processors, e.g., the hardware processor 260 and at least one other hardware processor that resides on the network interface card 240. In particular, as shown in FIG. 2, the data plane functions comprise a first set of data plane functions 290 which are executed by the hardware processor 260, and a second set of data plane functions 292 which are executed by an optimized processor, such as a hardware accelerator, which resides on the network interface card 240.

In this regard, the embodiment of FIG. 2 provides a segregated and accelerated data plane framework wherein certain data plane functions are implemented using an optimized processor, such as a hardware accelerator. By way of example, standard data plane functions such hash computation, data compression, and data de-duplication functions, etc., can be implemented using optimized hardware and functionality that is built-in the network interface card 240. By removing certain data plane functions 292 (e.g., hash, compression, de-duplication) from the hardware processors 260 (e.g., general purpose microprocessors), increased levels of performance per (effective) instruction can be achieved. This gain can be realized as increased application performance, improved performance per dollar, reduced energy consumption or some combination of the above. Indeed, by performing certain data plane functions such as compression and de-duplication in the network interface card 240 using an optimized hardware processor, there is a less amount of data that flows to the hardware processors 260, which reduces the processing burden on the hardware processors 260 when, for example, such hardware processors 260 are implemented as general purpose processors. Moreover, a workload optimization is realized by distributing data plane functions across one or more hardware processors that are optimized to perform certain data plane functions.

FIG. 3 schematically illustrates a data storage system 300 having a segregated data plane and a segregated control plane architecture, according to an embodiment of the invention. The data storage system 300 of FIG. 3 is similar to the data storage system 200 of FIG. 2, except that the data storage system 300 comprises a segregated control plane architecture, wherein control plane functions 380/382 are segregated between the hardware processors 260 of the data nodes 212 that reside on the storage servers 210, and one or more additional hardware processors 360 that reside on control nodes 310-1, . . . , 310-k (collectively referred to as control nodes 310).

More specifically, as shown in FIG. 3, the control nodes 310-1, . . . , 310-k are coupled to the second switch 230 via respective links 232 to enable communication with the data nodes 212 of the storage servers 210 through the second switch 230. The hardware processors 360 implemented on the control nodes 310 are configured to execute virtual control plane functions 382 (alternatively referred to as "vControl Plane" 382) on behalf of the storage servers 210. The virtual control plane functions 382 comprise one or more global control plane functions that are segregated from other control plane functions 380 (alternatively referred to as "dControl Plane 380") that are executed on the data nodes 212 of the storage servers 210.

The data storage framework of FIG. 3 takes into consideration the fact that certain control plane functionality (e.g., global control functions) is shared among the storage servers 210, and as the data storage system 300 is scaled, the sharing of such control plane functionality becomes a bottleneck with regard to, e.g., memory or CPU cycles. For example, such control plane functionality includes metadata management, container orchestration, and other control plane functions that are not tightly coupled to the control or management of data plane functions associated with data flow through the storage severs 210. On the other hand, certain control plane functionality to control data plane functions such as compression, de-duplication, protocol termination, etc., is tightly coupled to the control or management of data plane functions associated with data flow through the storage servers 210.

In this regard, in the embodiment of FIG. 3, the control plane functions 382 (e.g., global control functions), which are shared between the storage servers 210, are segregated from those control plane functions 380 that control the data flow through the storage servers 210, and implemented as virtual control plane functions 382 on the control nodes 310. In one embodiment, the hardware processors 360 that execute the virtual control plane functions 382 comprise low-latency general purpose processors. As the data storage system 300 is scaled to include more storage servers 210, the virtualization of the control functions 382 (such as metadata management), and the distribution of the virtual control functions 382 over a larger number of control nodes 310, enables more effective data management and sharing system information.

More specifically, by way of example, metadata management functions include construction and managing mapping data structures that provide information as to where certain data is stored in the media nodes 270 of the data storage system 300, and which media nodes 270 incoming data is to be written to. As the data storage system 300 is scaled, the virtualization of global control plane functions such as metadata management, for example, enables more effective control, management and access to shared data, and minimizes communication between the storage servers 210. As workload increases, additional instances of the virtual control plane 382 can be provisioned on one or more of the control nodes 310 so that the virtual control plane 382 can remain proportional to overall customer workload, thereby increasing efficiency. The increased efficiency can be realized as increased application performance, improved performance per dollar, reduced energy consumption or some combination of the above.

FIG. 4 schematically illustrates a data storage system 400 having a segregated data plane and a segregated control plane architecture, according to another embodiment of the invention. The data storage system 400 of FIG. 4 is similar to the data storage system 300 of FIG. 3, except that each of the data nodes 212 of the storage servers 210 shown in FIG. 4 implements a system-on-chip (SOC) 410 which is an integrated circuit that integrally comprises network controller circuitry, memory controller circuitry, and processor circuitry to perform control plane functions, data plane functions, and other functions, on a single integrated circuit (IC) chip. In this embodiment, the each SOC 410 leverages one or more optimized hardware accelerators and/or efficient throughput processors for performing segregated control plane and data plane functions.

More specifically, as shown in FIG. 4, each SOC 410 comprises a first hardware processor 420 and a second hardware processor 430. In one embodiment, the first hardware processor 420 comprises a special purpose microprocessor, for example, which performs the control plane functions 380 and the data plane functions 290. In addition, in one embodiment of the invention, the second hardware processor 430 performs I/O functions 440, and comprises one or more hardware accelerators, for example, to perform the data plane functions 292. The input/output functions 440 include functions that are performed by a network interface card (e.g., the network interface cards 240 of FIGS. 2 and 3). In this regard, each SOC 410 comprises integrated network processor circuitry for implementing network I/O functions, thereby eliminating the need for separate network interface cards. Furthermore, each SOC 410 comprises integrated memory controller circuitry to implement the functionality of the memory controllers 272 of the media nodes 270. By utilizing the SOCs 410, the embodiment of FIG. 4 provides enhanced efficiency in terms of lower cost and less power consumption, for example.

FIG. 5 schematically illustrates a data storage system 500 having a segregated data plane and a segregated control plane architecture, according to yet another embodiment of the invention. The data storage system 500 of FIG. 5 is similar to the data storage system 400 of FIG. 4, except that the data storage system 500 comprises a fabric-centric architecture in which the data nodes 212 and the media nodes 270 in the architecture of shown in FIG. 4 are separated into independently scalable, efficient and optimized exchangeable building blocks, wherein the building blocks are based on optimized fabric-connected functional elements.

More specifically, as shown in FIG. 5, the data storage system 500 comprises a plurality data nodes 512-1, 512-2, . . . , 512-j (collectively referred to as data nodes 512), and a plurality of media nodes 520-1, 520-2, . . . 520-m (collectively referred to as media nodes 520). The media nodes 520 comprise the memory controller circuitry 272 and media devices 274, and are implemented on machines that are separate from the machines on which the data nodes 512 are implemented. The data nodes 512 and the media nodes 520 are connected to the second switch 230 via communication links 231 and 233, respectively, which enables peer-to-peer communication between the data nodes 512, and which enables any one of the media nodes 520 to be independently accessed by any one of the data nodes 512. In this embodiment, at least one media node 520 comprises a hardware processor that is configured to execute one or more control plane and data plane functions that are segregated from other control plane and data plane functions executed on at least one data node 512.

In particular, in one embodiment of the invention, similar to the data nodes 212 of the storage servers 210 shown in FIG. 4, the data nodes 512 in FIG. 5 each comprise an SOC 410 having first and second hardware processors 420 and 430, wherein data plane functions 292 and input/output functions 440 (as discussed above) are executed by the second hardware processors 430. The first hardware processors 420 implement control plane functions 380-1 (dControl) and data plane functions 290-1. Moreover, the media nodes 520 each comprise an SOC 530 which includes the integrated memory controller circuitry 272, as well as hardware processor circuitry to implement control plane functions 380-2 (dControl) and data plane functions 290-2.

For example, in one embodiment, the control plane functions 380-1 and 380-2 collectively include the control plane functions 380 shown in FIG. 4, but wherein the control plane functions 380 are segregated so that certain control plane functions 380-1 are executed on the data nodes 512 and other control plane functions 380-2 are executed on the media nodes 520. Similarly the data plane functions 290-1 and 290-2 collectively comprises the data plane functions 290 shown in FIG. 4, but wherein the data plane functions 290 are segregated so that certain data plane functions 290-1 are executed on the data nodes 512 and other data plane functions 290-2 are executed on the media nodes 520.

In this embodiment, the data plane functionality 290-2 and control plane functionality 380-2 is executed on a given media node 520 to handle one or more functions that are associated with the type or types of media devices 274 implemented on the given media node 520, e.g., functions that are tightly coupled to the storage protocols. For example, for a Hadoop storage protocol, the data plane functionality 290-2 and control plane functionality 380-2 executed on a given media node 520 can include Hadoop Map Reduce functions to locally perform map tasks and reduce tasks on the given media node 520 and, thereby, provide "near-data" processing when storing data to a cluster of the media devices 274.

The fabric-centric data storage system embodiment of FIG. 5 provides many advantages. For example, the data storage system 500 can be scaled (both, scale-in and scale-out) with an improved independence of system building blocks, providing maximum flexibility and future upgradeability. In particular, the data nodes 512 can be scaled independently from the media nodes 520 by, e.g., adding additional data nodes 512 (scale out) and/or adding more computing resources (e.g., processors, RAM, etc.) to the data nodes 512. Similarly, the media nodes 520 can be scaled independently from the data nodes 512 by, e.g., adding additional media nodes and/or adding more computing resources (e.g., processors, RAM, etc.) to the media nodes 520. In this regard, the fabric-centric data storage system embodiment of FIG. 5 can readily achieve flexibility of workload-optimized processing through the implementation of exchangeable fabric-connected building elements.

Moreover, data storage system architecture of FIG. 5, which is based on fabric-connected building blocks, may also be a foundation for converged infrastructure solutions, an example embodiment of which will be discussed in further detail below with reference to FIG. 11, for example. Additional types of fabric connected building blocks can be implemented based on other processing efficient elements such as, e.g., general purpose computing on graphics units (GPGPUs), digital signal processors (DSPs) or field programmable gate arrays (FPGAs), which provide support for other type of workloads as well as near-data processing.

In accordance with embodiments of the invention, segregation of the data plane and/or control functions and the utilization of diverse hardware processing capabilities enables the data plane and/or control plane functions to be efficiently executed using suitable hardware processors, and thereby gain efficiency in data storage processing. Indeed, as discussed above, certain data plane functions can be executed on specialized fixed function hardware accelerators. Moreover, certain control and data plane functions algorithms can be executed on efficient throughput processors. In addition, virtualized control plane functions (which are shared among multiple storage servers) can segregated from the control plane and be executed on low latency general purpose microprocessors which are amenable to virtualization and dynamic provisioning.

Moreover, embodiments of the invention advantageously enable effective scaling and provisioning of a data storage system. Indeed, fixed point acceleration capabilities, network bandwidth, and control plane memory (which is a function of media size) can be appropriately provisioned based on the amount of storage media. In addition, virtual control plane instances can be provisioned based on workload. Moreover, fabric connected building blocks (e.g., FIG. 5, FIG. 11) allow a data storage system to be configured for efficient scale-in or/and scale out scenarios.

As noted above, the segregation of control plane functions and/or data planes functions into different sets of functions can be based on one or more discrimination criteria such as, e.g., efficiency of execution of a given function on a given hardware processor. Indeed, there are various factors that can be considered for determining what data plane and/or control plane functionality to move from, e.g., general purpose microprocessor cores to energy efficient general purpose cores, specialized cores (e.g. GPU/DSP) and specialized coprocessors/accelerators. A primary consideration in segregating and executing such functions on different hardware processors is to improve performance and TCO (total cost of ownership), wherein TCO is measured in terms of high availability and a unit process for delivering an application and/or data, for example. Various methods can be considered to identify which control plane and/or data plane functions to be segregated and moved to different hardware processors that are optimized for executing such functions.

For example, a primary goal of segregation is to reduce an amount of energy consumed for each function that is performed by executing certain workloads using a most efficient processing platform. The data plane and control plane functionality should be expressed as parallel as practical with special consideration given to avoid excessive data movement (e.g., bump in wire accelerators are preferential). In one embodiment, optimization starts by identifying any repetitive, significant, data plane functions that can be offloaded to specialized hardware. Examples of such data plane functions include, for example, hash, compression, decompression, encryption, decryption, erasure coding, as well as any other transformations applied to the data flow. In this regard, due consideration should be given to understand the significance of the processing within the system context of the overall application.

Various hierarchical critical path analysis tools can be utilized to identify any natural parallelism, in addition to that which is already exposed by a programmer. These tools can estimate the potential for parallelizing a region and provide a ranked order of specific regions that are likely to have the largest performance impact when parallelized. This knowledge can be leveraged to produce more parallel code. Developing code that can run across higher core count architectures is a key component to improve performance and TCO.

Finally, any threads of functionality that are not particularly latency sensitive can be considered as good candidates for migrating to processor cores that are optimized for energy per instruction. In addition, modern Linux schedulers are available, for example, which track the average load for individual processes. This type of runtime analyses can help identify other migration candidates based upon execution profile.

It is to be understood that FIGS. 2, 3, 4, and 5 depict high-level architectures for implementing data storage systems according to embodiments of the invention. Such data storage systems can be implemented using various types of networking, data storage, and communication interface protocols. FIG. 6 schematically illustrates a specific implementation of a data storage system that is based on the architecture of FIG. 2, according to an embodiment of the invention. As shown in FIG. 6, in one embodiment of the invention, the network links 221 are implemented using an Ethernet network communication protocol and associated hardware, such as Gigabit Ethernet (GbE) or 10-Gigabit Ethernet (10 GbE) to enable network communication with the data nodes 212 of the storage servers 210. In addition, in one embodiment of the invention, the network links 231 are implemented using InfiniBand (IB), for example, or some other suitable computer networking communications standard and associated hardware, which utilizes a switched fabric topology to enable high-performance, and low latency communication between the data nodes 212 of the storage servers 210.

Moreover, in one embodiment of the invention, the IB data transmissions to and from each of the data nodes 212 of the storage servers 210 is handled by the fabric cards 250, which are implemented via an InfiniBand HBA (host bus adaptor). The HBAs comprise hardware I/O adaptors that implement various low-level I/O interface functions to manage the transfer of data over the communication links 231 to and from the storage servers 210.

As further shown in FIG. 6, in one embodiment of the invention, communication between the first hardware processor 260 and the other components (e.g., network interface card 240, fabric card 250, and media node 270) is implemented using a high-speed serial communications interface 610 such as Peripheral Component Interconnect Express (PCIe), or some other a high-speed serial computer expansion bus standard. As is known in the art, PCIe is a serial version of the PCI standard, which adheres to the host/peripheral load/store DMA-based architecture of the PCI standard on top of a serial physical and link layer.

In one embodiment of the invention, each of the data nodes 212 of the storage servers 210 comprises a fan-out controller 620, wherein the fan-out controller 620 is a hardware component that is configured to connect a single serial I/O port of the hardware processor 260 to multiple serial fabric links 622 that are connected to corresponding controller/media blocks 272/274 of an associated media node 270 It is to be understood that the elements 610, 620, and 622 shown in FIG. 6 collectively represent an embodiment of the communication interface/links 276 of FIG. 2.

Furthermore, each of the data nodes 212 of the storage servers 210 comprises a RAM (random access memory) device 630 that is utilized to store data and program instructions which are utilized by the hardware processor 260 to execute the control plane functions 280 and data plane functions 290. In addition, each network interface card 240 comprises a hardware processor 640 which executes I/O functions 642 and data plane functions 292, and a RAM device 650 to store data and program instructions which are utilized to execute the I/O functions 642 and data plane functions 292. The example embodiment of FIG. 6 further illustrates that each control plane 280 comprises a plurality (n) of control plane functions (C0, C1 C2, . . . , Cn), and that each data plane 290/292 comprises a plurality (n) of data plane functions (D0, D1, . . . , Dn), which are executed under control of the corresponding control plane functions (C0, C1, C2, . . . , Cn). The data plane functions 290/292 are segregated such that one set of data plane functions 292 (e.g., D0 and D1) are executed by the hardware processor 640 on the network interface card 240, and another set of data plane functions 290 are executed on the hardware processor 260 of the data node 212. An example embodiment of a given one of the network interface cards 240 of FIG. 6 will be discussed below with reference to FIG. 7.

It is to be understood that the RAM devices 630 and 650 shown in FIG. 6 (and other drawings) may comprise any type of RAM device and hierarchical RAM architecture, which may be part of system memory. The RAM devices 630 and 650, or portions thereof, may be operated as instruction and/or data cache memory (e.g., level 1, level 2, level 3, etc.). The RAM devices 630 and 650 store program instructions and/or data, which is read and processed by the respective hardware processors 260 and 640 to implement various functions (e.g., data plane functions, control plane functions, I/O functions, etc.) associated with the storage processing.

The RAM devices 630 and 650 (and other storage devices described herein) having such program code tangibly embodied thereon are examples of what is more generally referred to herein as a processor-readable storage medium. Other examples of processor-readable storage media embodying program code include, for example, optical or magnetic disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein is understood to specifically exclude transitory, propagating signals.

Figure 7:
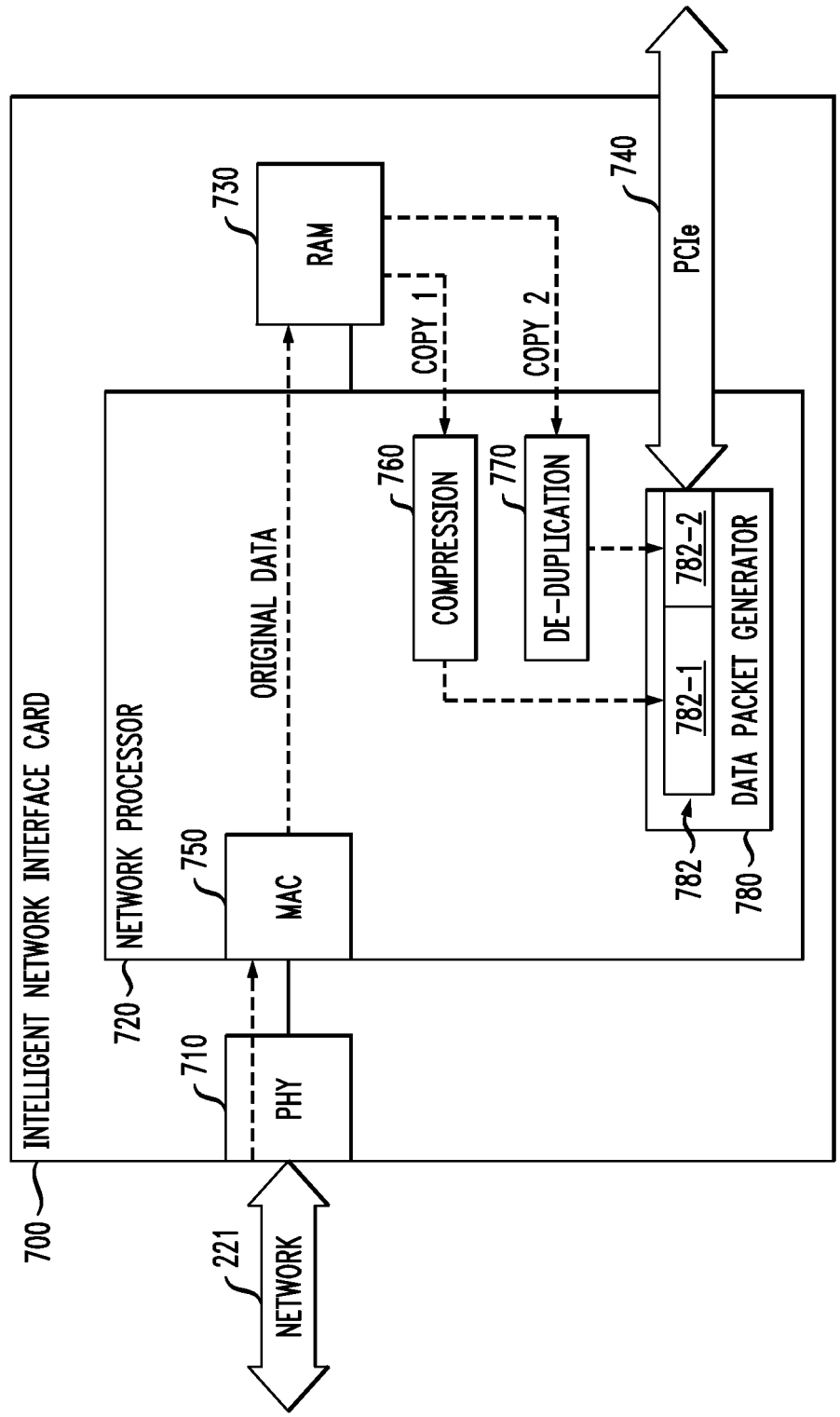
FIG. 7 schematically illustrates a network interface card which is configured to perform accelerated data plane functions, according to an embodiment of the invention.
Figure 8:
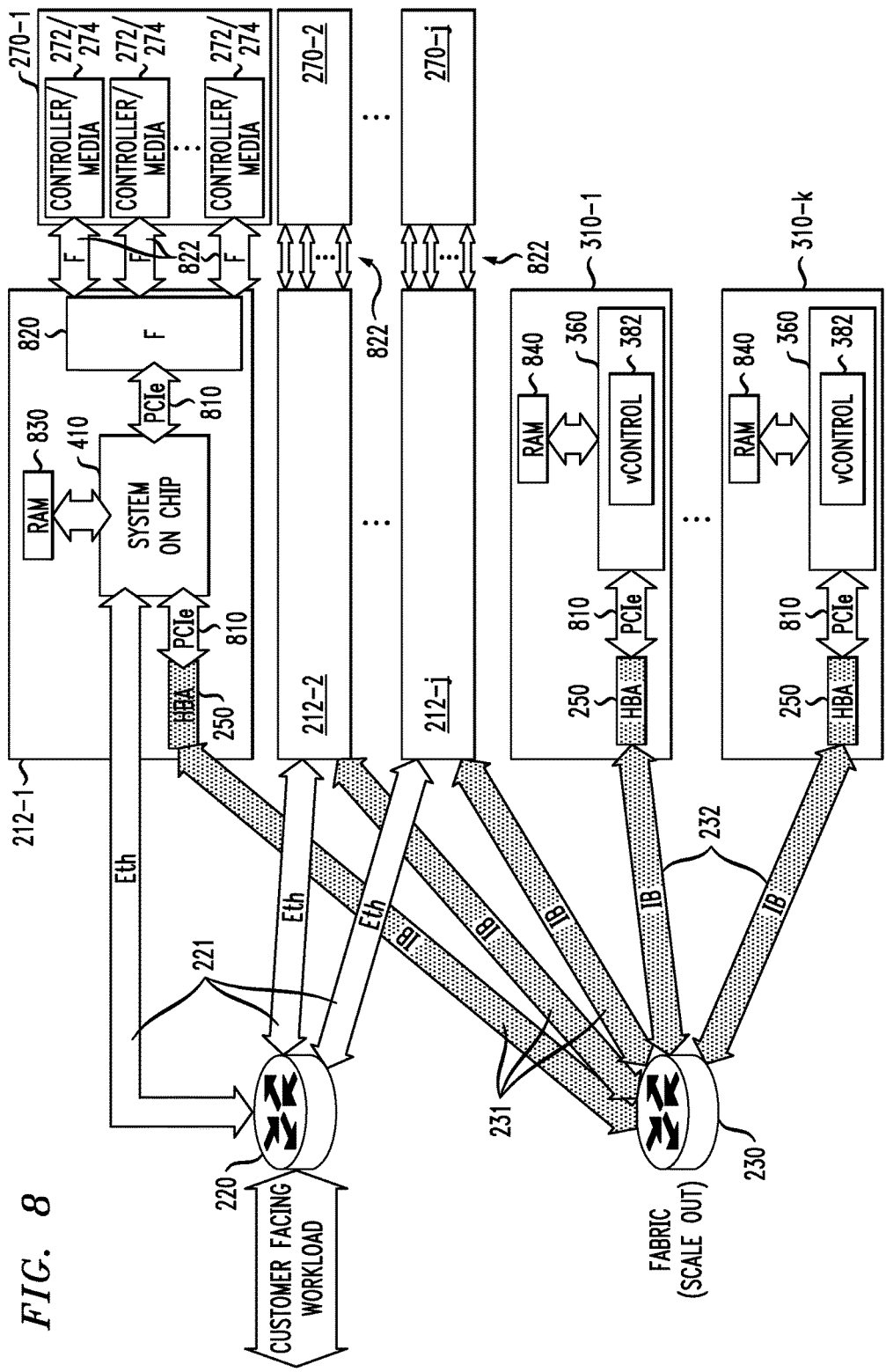
FIG. 8 schematically illustrates a specific implementation of a data storage system that is based on the architecture of FIG. 4, according to an embodiment of the invention.

FIG. 7 schematically illustrates a network interface card which is configured to perform accelerated data plane functions, according to an embodiment of the invention. FIG. 7 illustrates an example embodiment of the network interface cards 240 shown in FIGS. 2 and 6, for example. A shown in FIG. 7, an intelligent network interface card 700 comprises a PHY module 710, a network hardware processor 720, a RAM device 730, and a serial I/O interface 740. The network hardware processor 720 comprises a MAC module 750, a first hardware processor core 760 to implement a first data plane function (e.g., compression), a second hardware processor core 770 to implement a second data plane function (e.g., de-duplication), and data packet generator circuitry 780.

The PHY module 710 represents the physical layer (Layer 1) of the OSI (Open Systems Interconnection) model of network communication, wherein the PHY module 710 comprises the circuitry to implement physical layer functions. The PHY module 710 connects the MAC module 750 to the physical network medium 221 (e.g., optical fiber or Ethernet cable, etc.) In particular, the physical layer comprises wiring, fiber, network cards, and other physical elements for transmitting data streams. The MAC module 750 is a sublayer of the "data link" layer (Layer 2) of the OSI stack, which is configured to encode and decode data packets into bits. The MAC module 750 comprises a media access controller (e.g., hardware controller) to implement addressing and channel access control functions to support communication between multiple nodes on a shared medium such as an Ethernet network. For example, the MAC module 750 is configured to identify source and destination MAC address (e.g., 48-bit identifier) that are included within packet frames that are received or transmitted over the network 221.

In one embodiment of the invention, the network hardware processor 720 comprises one or more hardware accelerators (e.g., cores 760 and 770) to perform fixed function acceleration of one or more data plane functions that are segregated from the data plane functions executed on the main CPU (hardware processor) of the storage server. In addition to the network traffic being routed through and processed by the intelligent network interface card 700 using standard I/O functions, a combination of dedicated hardware and programmable accelerators are implemented in the network hardware processor 720 to offload one or more data plane functions that would otherwise be implemented by the general purpose CPU on the storage servers.

For example, the intelligent network interface card 700 implements standard I/O functions to, e.g., terminate a network protocol, such as RDMA over Converged Ethernet (RoCE). RoCE is a network protocol that enables RDMA (remote direct memory access) over an Ethernet network, wherein RDMA is a direct memory access from the memory of one computer into the memory of another computer without use of the computer operating systems. RDMA permits high-throughput, low-latency networking in, e.g., a distributed data storage system.

Next, as shown in FIG. 7, after an input stream is received and processed by MAC module 750 to recover original data, the original data is stored in the RAM 730, and the network hardware processor 720 proceeds to perform additional co-processing to execute one or more data plane functions. For example, in one embodiment of the invention, the network hardware processor 720 is configured to execute a data compression function on a first copy (Copy1) of the original data accessed from the RAM 730 using the first hardware accelerator core 760, and to execute a de-duplication function on a second copy (Copy2) of the original data accessed from the RAM 730 using the second hardware accelerator core 770. As is known in the art, the data de-duplication function is a specialized data compression technique to eliminate duplicate copies of repeating data, and results in the generation of a hash.

In one embodiment, the data compression and de-duplication data plane functions can be executed by respective hardware accelerator cores 760 and 770 in parallel. During execution of the data plane functions (e.g., data compression and de-duplication) on the network hardware processor 720, low level control plane functions associated with the data plane functions can be executed on another hardware processor (e.g., main CPU) of the storage server, while control data (and other data such as intermediate results) associated with the data plane functions can be temporarily stored in the RAM 730 and accessed by the hardware accelerator cores 760 and 770 to perform such functions.

The processing results (e.g., hash and compressed data), are then sent to the data packet generator 780, which assembles the output data into a data packet 782 comprising first and second portions 782-1 and 782-2. The first portion 782-1 comprises the data output (compressed data) from the first hardware accelerator core 760, and the second portion 782-2 comprises the data output (hash data) from the second hardware accelerator core 770. The network hardware processor 720 then transfers the data packet 782 (via DMA) to the main memory of the hardware processor (e.g., CPU) of the storage server using the serial interface 740 (e.g., PCIe interface).

The embodiment of FIG. 7 provides various advantages in terms of processing efficiency and reduced energy consumption. For example, offloading the responsibility of performing complex data plane functions such as de-duplication and data compression from the main CPU (e.g., general purpose microprocessor) to hardware accelerator cores results in, e.g., a reduction in traffic from the network interface card 700 to the main CPU, a reduction in memory bandwidth pressure of the main CPU, and an improvement of the cache hit rate of the main CPU.

FIG. 8 schematically illustrates a specific implementation of a data storage system that is based on the architecture of FIG. 4, according to an embodiment of the invention. The example embodiment of FIG. 8 is similar to that of FIG. 6 in that the network links 221 are implemented using an Ethernet network communication protocol and associated hardware, for example, and the network links 231 are implemented using InfiniBand, for example, or some other suitable computer networking communications standard and associated hardware. Moreover, the network links 232 to the control nodes 310 are implemented using InfiniBand. In addition, in one embodiment of the invention, the IB data transmissions to and from each of the control nodes 310 are handled by fabric cards 250, which comprise InfiniBand HBAs.

As further shown in FIG. 8, in one embodiment of the invention, communication between the SOC 410 and the other components (e.g., fabric card 250, and media node 270) in each of the storage servers 210 is implemented using a high-speed serial communications interface 810 such as PCIe. In addition, in each of the control nodes 310, communication between the hardware processor 360 and the fabric card 250 is implemented using the same high-speed serial communications interface 810 such as PCIe.

Furthermore, similar to the embodiment of FIG. 6, each of the data nodes 212 of the storage servers 210 in FIG. 8 comprises a fan-out controller 820 that is configured to connect a single serial I/O port of the SOC 410 to multiple serial fabric links 822 which are connected to corresponding controller/media blocks 272/274 of corresponding media nodes 270. It is to be understood that in one embodiment of the invention, the fan-out controller 820, fabric links 822 and memory controllers 272 of the media nodes 270 can be implemented on the respective SOCs 410 (as in the embodiment of FIG. 4).

Furthermore, each of the data nodes 212 of the storage servers 210 comprises a RAM device 830 which is utilized by the processor circuitry (e.g., hardware processors 420 and 430, FIG. 4) on the SOC 410 to store data and program instructions for executing the various functions (e.g., I/O functions 440, data plane functions 290/292, and control plane functions 380, FIG. 4) by the hardware processors of the SOC 410. In addition, each of the control nodes 310 implement a RAM device 840 which is utilized by the hardware processor 360 to store data and program instructions that are used to execute the virtual control plane functions 382.

Figure 9:
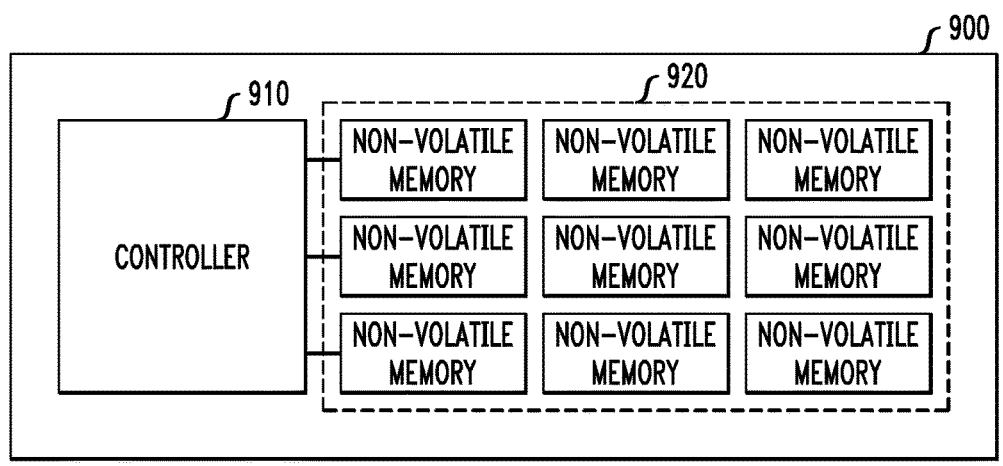
FIG. 9 schematically illustrates a media node which can be implemented in a data storage system, according to according to an embodiment of the invention.

FIG. 9 schematically illustrates a media node which can be implemented in a data storage system, according to according to an embodiment of the invention. In particular, FIG. 9 shows a media node 900 comprising a memory controller 910 and an array of non-volatile memory devices 920. In one embodiment, the memory controller 910 is implemented using a combination of hardware and firmware, and is configured to control and manage the flow of data that is stored to and accessed from one or more memory devices in the array of non-volatile memory devices 920.

In one embodiment of the invention, the array of non-volatile memory devices 920 comprises an array of flash memory devices that are mounted on an application board along with an IC chip that implements the functions of the memory controller 910. The array of non-volatile memory devices 920 may comprise other types of non-volatile memory devices, and packaged with the memory controller circuitry 910 using known techniques. The media node 900 of FIG. 9 can be used to implement one or more of the media nodes 156 of FIG. 1, and one or more of the media nodes 270 shown in FIGS. 2 and 3, for example. The media node 900 can be used as a building block to construct a modular data storage system, as described in further detail below with reference to FIG. 11.

Figure 10:
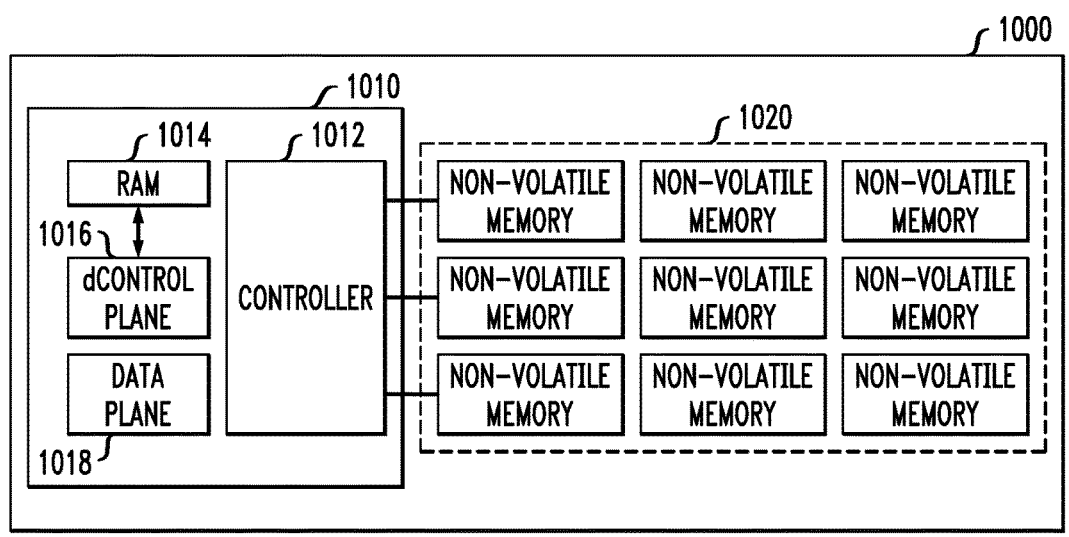
FIG. 10 schematically illustrates a media node which can be implemented in a data storage system, according to another embodiment of the invention.
Figure 11:
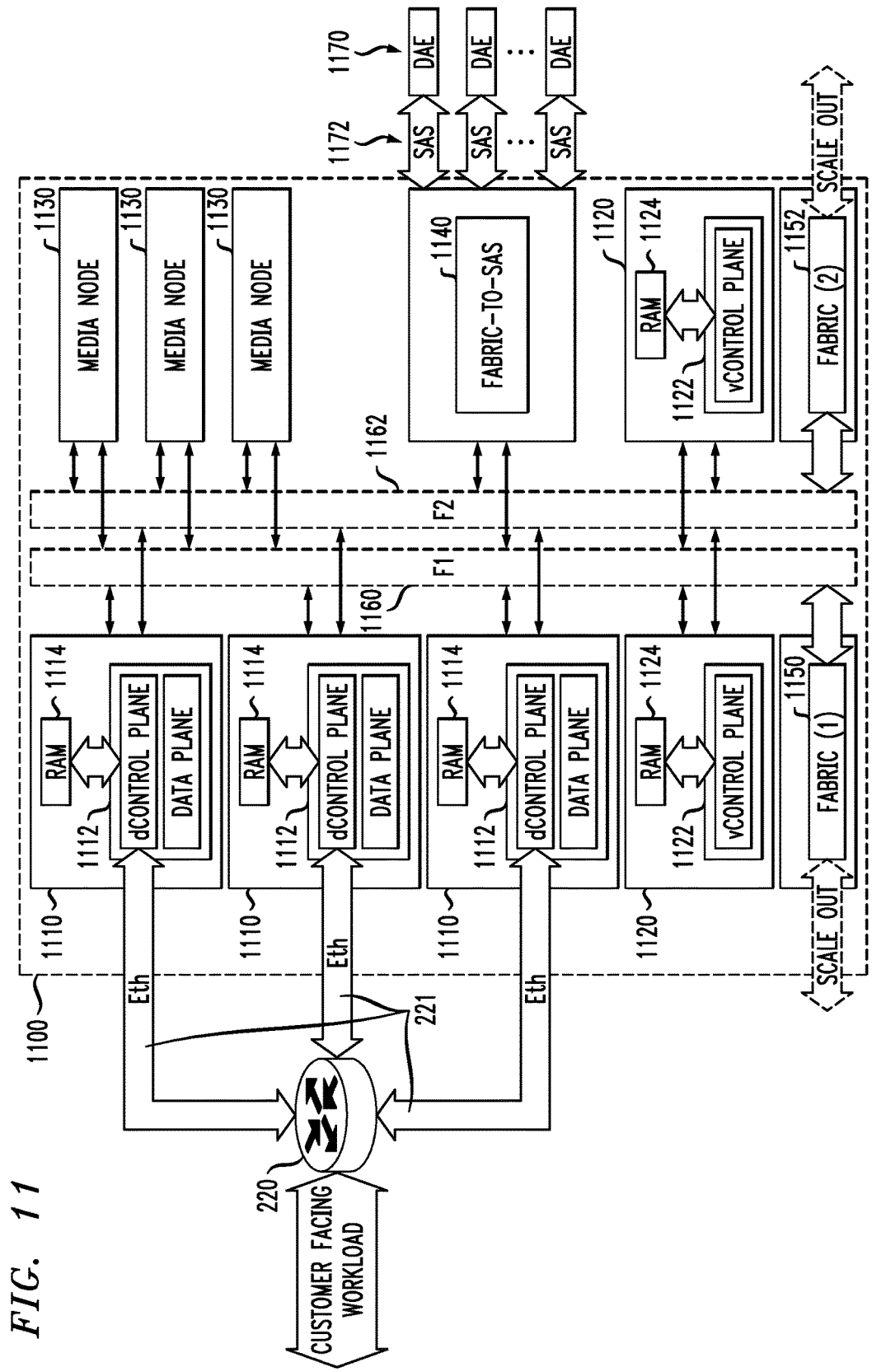
FIG. 11 schematically illustrates a modular data storage system, according to an embodiment of the invention.

FIG. 10 schematically illustrates a media node which can be implemented in a data storage system, according to another embodiment of the invention. In particular, FIG. 10 shows a media node 1000 comprising a SOC 1010 and an array of non-volatile memory devices 1020. The SOC 1010 comprises a memory controller 1012, a RAM device 1014, and hardware processor circuitry to execute segregated control plane functions 1016 and data plane functions 1018. In one embodiment, the memory controller 1010 is implemented on the SOC 1010 using a combination of hardware and firmware, and is configured to control and manage the flow of data that is stored to and accessed from one or more memory devices in the array of non-volatile memory devices 1020. Similar to the media nodes 520 in the embodiment of FIG. 5 discussed above, the media node 1000 of FIG. 10 can be considered a "smart" media node which implements certain control plane functions 1016 and associated data plane functions 1018 which are, for example, tightly coupled to the storage protocol(s) implemented by the media node 1000, or functions which provide "near-data" processing when storing data to one or more of the memory devices 1020. Such near-data processing provides increased processing efficiency and reduced network traffic, for example.

In one embodiment of the invention, the array of non-volatile memory devices 1020 comprises an array of flash memory devices that are mounted on an application board along with the SOC 1010. The array of non-volatile memory devices 1020 may comprise other types of non-volatile memory devices, which are packaged with the SOC 1010 using known techniques. The media node 1000 of FIG. 10 can be used to implement one or more of the media nodes 156 of FIG. 1, and one or more of the media nodes 520 shown in FIG. 5, for example. The media node 1000 can be used as a building block to construct a modular data storage system, as shown in FIG. 11.

In particular, FIG. 11 schematically illustrates a modular data storage system 1100 according to an embodiment of the invention. The modular data storage system 1100 implements a combination of smart media nodes, optimized hardware processor, smart I/O adaptors and global control processors, for example, which are all interconnected through a peer-to-peer fabric, providing a modular fabric centric architecture which is highly scalable. More specifically, as shown in FIG. 11, the modular data storage system 1100 comprises a plurality of data nodes 1110, a plurality of control nodes 1120, a plurality of media nodes 1130, an interface adapter 1140, a fabric I/O controller 1150, a fabric plane 1160, and at least one redundant fabric I/O controller 1152 and redundant fabric plane 1162.

In one embodiment, the data nodes 1110 each comprise an SOC 1112 and a RAM device 1114. Similar to embodiments discussed above, the SOC 1112 comprises integrated circuitry to implement I/O functions that are commonly performed by network interface cards and fabric cards, as well one or more hardware processors (e.g., hardware accelerators and/or other optimized hardware processors) to execute data plane and control plane functions. For example, in each SOC 1112, data plane functions can be segregated and executed on different types of hardware processors (e.g., heterogeneous cores formed on the SOC 1112) that are optimized for executing different data plane functions. In addition, the RAM devices 1114 are configured to store data and program instructions that are used by the integrated circuitry on the SOC 1112 to perform the various functions, such as the I/O functions data plane functions, and control plane functions, which are supported by the data nodes 1110.

Moreover, in one embodiment, the control nodes 1120 each comprise an SOC 1122 and a RAM device 1124. Similar to embodiments discussed above, the SOC 1122 comprises integrated circuitry to implement I/O functions that are commonly performed by fabric cards, as well one or more hardware processors (e.g., general purpose microprocessors) to execute virtual control plane functions (vControl Plane), which are segregated from the control plane functions (dControl Plane) executed by the data nodes 1110, and which are distributed over two or more control nodes 1120. In addition, the RAM devices 1124 are used by the control nodes 1120 to store data and program instructions that are used by the integrated circuitry on the SOC 1122 to perform the various functions such as I/O functions and virtual control plane functions, which are implemented on the control nodes 1170.

In one embodiment of the invention, one or more of the media nodes 1130 can be implemented using a media node framework 900 such as shown in FIG. 9. In another embodiment of the invention, one or more of the media nodes 1130 can be implemented using a media node framework 1000 such as shown in FIG. 10, wherein at least one media node 1130 comprises a hardware processor configured to execute one or more control plane and data plane functions that are segregated from other control plane and data plane functions executed on the data nodes 1110, for reasons as discussed above. In yet another embodiment of the invention, the modular data storage system 1100 of FIG. 11 can be implemented using a combination of one or more media nodes 900 (FIG. 9) and one or more smart media nodes 1000 (FIG. 10).

In one embodiment of the invention, the interface adapter 1140 implements one or more standard interfaces that enable the modular data storage system 1100 to connect to and communicate with one or more direct attached storage nodes. For example, in one embodiment of the invention, the interface adapter 1140 comprises a fabric-to-SAS adaptor, which enables the modular data storage system 1100 to be connected to one or more disk array enclosures (DAEs) 1170 using corresponding SAS connectors 1172. Each DAE 1170 comprises an array of hard disks that are stacked above each other. The interface adaptor 1140 provides additional scalability to the modular data storage system 1100.

The data nodes 1110, the control nodes 1120, the media nodes 1130, and the interface adapter 1140 are all connected to the fabric plane 1160, and to the redundant fabric plane 1162. This fabric framework enables peer-to-peer communication between data nodes 1110, the control nodes 1120, the media nodes 1130, and the interface adapter 1140 over the fabric plane 1160 (and redundant plane 1162, when necessary). Moreover, the fabric I/O controller 1150 and redundant fabric I/O controller 1152 are configured to enable a scale-out connection and communication with another data storage system. For example, in one embodiment of the invention, a data storage system can be implemented by connecting two or more of the modular data storage system 1100 together, wherein the data nodes 1110, the control nodes 1120, the media nodes 1130 in each of the modular data storage systems 1110 communicate over the switched fabric created by the collection of the fabric I/O controllers 1150 and fabric planes 1160. In addition, the control nodes 1110 of other modular units may or may not be connected to the customer facing workload switch fabric 220.

It is to be appreciated that the modular storage system 1100 of FIG. 11 can be implemented as a converged infrastructure system that is integrated within a housing to provide a self-contained, modular unit. Moreover, the modular data storage system 1110, and other data storage system embodiments described herein are particularly useful for hyper scale computing in a distributed environment since the extensibility and processing efficiency of such data storage systems can readily accommodate exponential increases in the volume of data and storage processing workloads on-demand in a cost-effective manner.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A data storage system, comprising:
 a plurality of media nodes, wherein each media node is configured to control data access operations for storing or accessing data to and from one or more persistent storage elements associated therewith;
 a plurality of data nodes coupled to the media nodes, wherein each data node comprises at least one hardware processor configured to execute data plane functions and control plane functions on data that is to be stored in one or more of the persistent storage elements;

a switch fabric configured to enable communication between the data nodes;

wherein at least one of (i) the data plane functions of at least a given one of the data nodes are segregated and executed by different hardware processors and (ii) the control plane functions of at least a given one of the data nodes are segregated and executed by different hardware processors; and a control node in communication with the data nodes through the switch fabric, wherein the control node comprises a hardware processor configured to execute one or more virtual control plane functions on behalf of the data nodes, wherein the one or more virtual control plane functions comprise one or more global control plane functions that are segregated from other control plane functions executed on the data nodes.

2. The data storage system of claim 1, wherein the different hardware processors include a first hardware processor and a second hardware processor, which are formed on different integrated circuit chips that are located on the given data node.

3. The data storage system of claim 2, wherein the given data node comprises a network interface card, wherein the network interface card comprises the first hardware processor.

4. The data storage system of claim 1, wherein at least one of the different hardware processors comprises a hardware accelerator.

5. The data storage system of claim 1, wherein the different hardware processors are integrated on a system-on-chip.

6. The data storage system of claim 1, wherein at least one data node is directly coupled to an associated media node.

7. The data storage system of claim 1, wherein at least one media node is connected to the switch fabric to enable different data nodes to communicate with the at least one media node through the switch fabric.

8. The data storage system of claim 1, wherein at least one media node comprises a hardware processor configured to execute one or more control plane and data plane functions that are segregated from other control plane and data plane functions executed on at least one data node.

9. A data center comprising the data storage system of claim 1.

10. The data storage system of claim 1, wherein the data storage system comprises a converged infrastructure system that is integrated within a housing to provide a modular unit.

11. The data storage system of claim 10, wherein the modular unit further comprises one or more interfaces to connect to and communicate with one or more direct attached storage nodes.

12. The data storage system of claim 10, wherein the modular unit further comprises:

a plurality of communication ports configured to enable network connections to be data nodes;

wherein the switch fabric comprises a fabric plane and a fabric input/output controller, wherein the switch fabric is configured to enable peer-to-peer communication between the media nodes, the data nodes, and the control node over the fabric plane, and wherein the fabric input/output controller is configured to enable a scale-out connection and communication with another data storage system; and wherein at least one media node comprises a hardware processor configured to execute one or more control plane and data plane functions that are segregated from other control plane and data plane functions executed on the data nodes.

13. The data storage system of claim 12, wherein the switch fabric further comprises a redundant fabric, plane and a redundant fabric input/output controller.

14. A method, comprising:

receiving, by a data node, data to be stored on a media node;

executing one or more data plane functions on a first hardware processor of the data node to process the received data;

executing one or more data plane functions on a second hardware processor of the data node to process the received data;

executing, one or more control plane functions on the second hardware processor of the data node to control the one or more data plane functions executed on the first and second hardware processors of the data node;

storing the processed data on the media node; and communicating with a control node, by the data node, to execute one or more virtual control plane functions on behalf of the data node wherein the one or more virtual control dare functions comprise one or more global control plane functions that are segregated from other control plane functions executed on the data node.

15. The method of claim 14, wherein the first hardware processor comprises at least one hardware-based accelerator.

16. The method of claim 14, wherein storing the processed data on the media node comprises the data node communicating with the media node through a switch fabric.

17. The method of claim 14, further comprising executing one or more control plane functions and data plane functions on a hardware processor of the media node, wherein the one or more control plane functions and data plane functions executed on the hardware processor of the media node are segregated from other control plane functions and data plane functions executed on the data node.

18. An article of manufacture comprising a processor-readable storage medium having stored therein program code of one or more software programs, wherein the program code is executable by one or more hardware processor devices to receive, by a data node, data to be stored on a media node;

execute one or more data plane functions on a first hardware processor of the data node to process the received data;

execute one or more data plane functions on a second hardware processor of the data node to process the received data;

execute one or more control plane functions on the second hardware processor of the data node to control the one or more data plane functions executed on the first and second hardware processors of the data node;

store the processed data on the media node; and communicate with a control node, by the data node, to execute one or more virtual control plane functions on behalf of the data node, wherein the one or more virtual control plane functions comprise one or more global control plane functions that are segregated from other control plane functions executed on the data node.

19. The article of manufacture of claim 18, wherein the program code is executable by the one or more hardware processor devices to enable the data node to communicate with the media node through a switch fabric to store the processed data on the media node.

20. The article of manufacture of claim 18, wherein the program code is executable by the one or more hardware processor devices to execute one or more control plane functions and data plane functions on a hardware processor of the media node, wherein the one or more control plane functions and data plane functions executed on the hardware processor of the media node are segregated from other control plane functions and data plane functions executed on the data node.

\* \* \* \* \*